United States Patent
Ge et al.

(10) Patent No.: US 9,822,697 B2
(45) Date of Patent: Nov. 21, 2017

(54) TURBINE EXPANSION RATIO ESTIMATION FOR MODEL-BASED BOOST CONTROL

(71) Applicant: GM Global Technology Operations LLC, Detroit, MI (US)

(72) Inventors: Ping Ge, Northville Township, MI (US); Yue-Yun Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 719 days.

(21) Appl. No.: 14/294,559

(22) Filed: Jun. 3, 2014

(65) Prior Publication Data
US 2015/0345377 A1    Dec. 3, 2015

(51) Int. Cl.
| | |
|---|---|
| B60K 6/20 | (2007.10) |
| F02B 37/24 | (2006.01) |
| F02B 37/12 | (2006.01) |
| F02D 41/00 | (2006.01) |
| F02D 41/14 | (2006.01) |

(52) U.S. Cl.
CPC ............. *F02B 37/24* (2013.01); *F02B 37/12* (2013.01); *F02D 41/0007* (2013.01); *F02D 41/145* (2013.01); *F02D 41/1447* (2013.01); *F02D 41/1448* (2013.01); *F02D 2041/1433* (2013.01); *Y02T 10/144* (2013.01)

(58) Field of Classification Search
CPC .. F02B 37/12; F02B 37/24; F02D 2041/1433; F02D 41/0007; F02D 41/1447; F02D 41/1448; F02D 41/145; Y02T 10/144
See application file for complete search history.

(56) References Cited

U.S. PATENT DOCUMENTS

| | | | | |
|---|---|---|---|---|
| 6,155,049 A | * | 12/2000 | Bischoff | F02B 37/00 60/602 |
| 7,788,922 B2 | * | 9/2010 | Muller | F02B 37/12 60/600 |
| 9,217,362 B2 | * | 12/2015 | Wang | F02B 37/013 |
| 2011/0036333 A1 | * | 2/2011 | Fontvieille | F02B 37/004 123/564 |
| 2011/0113773 A1 | * | 5/2011 | Liu | F02B 37/004 60/602 |
| 2012/0222417 A1 | * | 9/2012 | Fontvieille | F02D 23/00 60/602 |
| 2013/0227945 A1 | * | 9/2013 | Fulton | F02D 41/1445 60/611 |
| 2014/0345255 A1 | * | 11/2014 | Zhu | F02B 37/22 60/273 |
| 2016/0131089 A1 | * | 5/2016 | Lahti | F02D 41/0007 60/605.2 |

\* cited by examiner

*Primary Examiner* — Jesse Bogue
(74) *Attorney, Agent, or Firm* — Cantor Colburn LLP

(57) ABSTRACT

A method for controlling a turbine of an engine system to achieve a desired boost pressure is provided. The method determines a desired exhaust gas pressure based on the desired boost pressure by using a model for a power balance between the turbine and a compressor of the engine system. The method generates a base command for controlling a position of a vane of the turbine based on a ratio of the desired exhaust gas pressure to a measured turbine outlet pressure.

17 Claims, 3 Drawing Sheets

TURBINE EXPANSION RATIO ESTIMATION FOR MODEL-BASED BOOST CONTROL

FIELD OF THE INVENTION

The subject invention relates to model-based boost control for a turbocharger and, more specifically, to estimating a turbine expansion ratio to generate a turbine vane position control command that controls boost pressure for a turbocharger.

BACKGROUND

Conventional control systems for today's engine systems have numerous calibration tables to deal with numerous different operating conditions. Moreover, in order to ensure accurate control of engine systems, the values in these tables have to be accurately calibrated for each particular engine system. With the increasing complexity of today's engine systems, it is becoming more difficult to calibrate numerous set points in numerous different tables that are used for generating control commands such as a turbine vane position control command that controls boost pressure for a turbocharger. Accordingly, it is desirable to provide methods and systems that reduce a quantity of calibration tables to use when generating control command.

SUMMARY OF THE INVENTION

In one exemplary embodiment of the invention, a method for controlling a turbine of an engine system to achieve a desired boost pressure is provided. The method determines a desired exhaust gas pressure based on the desired boost pressure by using a model for a power balance between the turbine and a compressor of the engine system. The method generates a base command for controlling a position of a vane of the turbine based on a ratio of the desired exhaust gas pressure to a measured turbine outlet pressure.

In another exemplary embodiment of the invention, an engine system comprising an engine, a turbine driven by exhaust gas from the engine, a compressor driven by the turbine, and a control module for controlling the turbine to achieve a desired boost pressure is provide. The control module is configured to determine a desired exhaust gas pressure based on the desired boost pressure by using a model for a power balance between the turbine and a compressor of the engine system. The control module is further configured to generate a base command for controlling a position of a vane of the turbine based on a ratio of the desired exhaust gas pressure to a measured turbine outlet pressure.

In yet another exemplary embodiment of the invention, a control system for controlling a turbine of an engine system to achieve a desired boost pressure is provided. The control system comprises a first module configured to determine a desired exhaust gas pressure based on the desired boost pressure by using a model for a power balance between the turbine and a compressor of the engine system. The control system further comprises a second module configured to generate a base command for controlling a position of a vane of the turbine based on a ratio of the desired exhaust gas pressure to a measured turbine outlet pressure.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
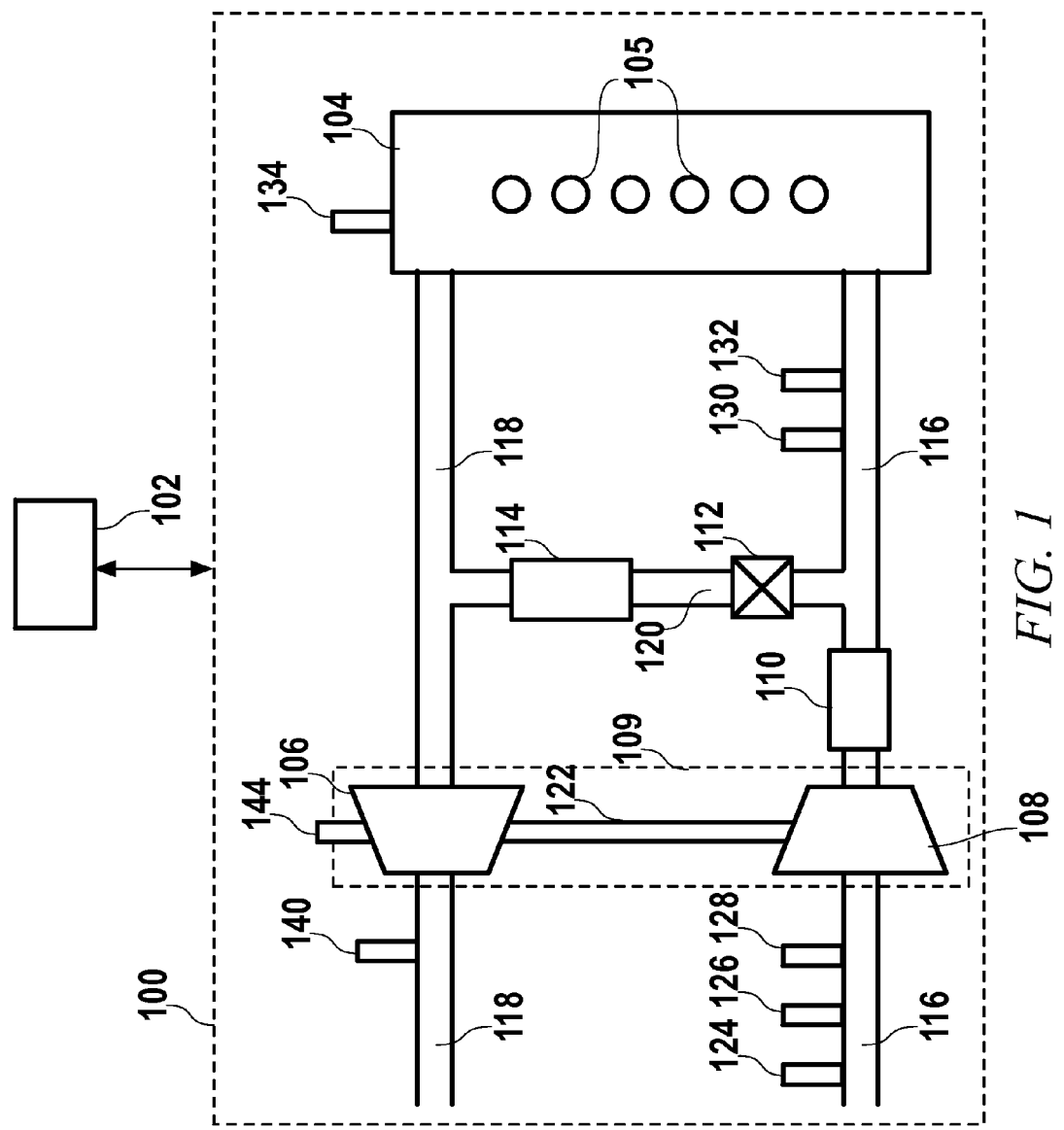
FIG. 1 depicts an engine system and a control module for controlling the engine system in accordance with embodiments of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 depicts an engine system 100 and a control module 102. The engine system 100 includes an internal combustion engine 104, a turbine 106, a shaft 122, an air compressor 108, a charge air cooler 110, an exhaust gas recirculation (EGR) valve 112, an EGR cooler 114, an air inlet conduit 116, an exhaust gas conduit 118, and an EGR conduit 120. The engine system may have other components, for example, valves in various locations of the conduits, are not depicted for simplicity of illustration and description.

The engine 104 is a multi-cylinder internal combustion engine and may be of any engine type including, but not limited to, a diesel engine, a gasoline engine, a homogeneous charge compression ignition (HCCI) engine, or other engine type. For simplicity of illustration and description, not all components of the engine 104 are depicted. For instance, an intake manifold, an exhaust manifold, a fuel injector, a spark plug, an air/fuel mixer, etc. that the engine 104 may or may not have depending on the engine type are not depicted. The engine 104 may be a two-stroke engine or a four-stroke engine.

An air inlet conduit 116 conducts ambient air to a plurality of cylinders 105 of the engine 104. An exhaust gas conduit 118 removes exhaust gases from the engine 104 when expelled during its normal operation. The compressor 108 compresses the inlet air, thus increasing the air's density to provide a higher concentration of oxygen in the air fed to the engine 104. The compressor 108 may be driven via a shaft 122 by the turbine 106 that is disposed in the exhaust gas conduit 118. In embodiments, the turbine 106 is a variable geometry turbine (VGT). The turbine 106, the shaft 122, and the compressor 108 constitute a turbocharger 109. Recirculation of exhaust gases is effected by the EGR valve 112 disposed in the EGR conduit 120 provided between the air inlet conduit 116 and the exhaust gas conduit 118. The EGR cooler 114 reduces the temperature of the re-circulated exhaust gases prior to being mixed with air admitted through the air inlet conduit 116. The compressed air cooler 110 dissipates the heat resulting from compression of the inlet air. Each of the components of the engine system 100 may be signally connected to the control module 102 to receive one or more control commands from the control module 102.

Sensing devices are disposed at various locations of the engine system 100 to monitor physical characteristics and generate signals which are related to engine and ambient parameters. The sensing devices may include an ambient or compressor inlet air pressure sensor 124, a compressor inlet air temperature sensor 126, a mass air flow sensor 128, an intake manifold pressure sensor 130, an intake manifold air temperature sensor 132, an engine speed sensor 134, a turbine outlet pressure sensor 140, and a VGT vane position sensor 144. In embodiments, the compressor inlet air pressure sensor 124, the compressor inlet air temperature sensor 126, and the mass air flow sensor 128 are disposed upstream of the compressor 108. In embodiments, the intake manifold pressure sensor 130 and an intake manifold air temperature sensor 132 are disposed downstream of the compressor 108 and upstream of the engine 104. Each of the sensing devices 124-144 is signally connected to the control module 102 to provide signal information which is transformed by the control module 102 to information representative of the state of the respective monitored parameter. In embodiments, some of the sensor values may be estimated, rather than being measured by sensors. For instance, an exhaust manifold pressure, an exhaust manifold temperature and the exhaust gas flow downstream of the engine 104 and upstream of the turbine 106 may be estimated using estimation models (not shown) based on other sensor values.

The control module 102 controls the operation of the engine system 100 based on the signals from the sensor devices and the ambient and engine parameters. For instance, in embodiments, the control module 102 controls the turbine 106 to adjust a VGT vane position to achieve a desired boost pressure by sending a VGT vane position control command or signal to the turbine 106. Specifically, in embodiments, the control module 102 determines a desired exhaust gas pressure based on a desired boost pressure, using a power balance model of the turbocharger (i.e., a model defining the power balance between the turbine 106 and the compressor 108). The control module 102 then generates a VGT vane position control command based on the desired exhaust gas pressure, using an orifice equation. By generating the VGT vane position control command using the equations, the control module 102 does not have to rely on as many calibration tables that the control module 102 otherwise would have in generating the VGT vane position control command.

Figure 2:
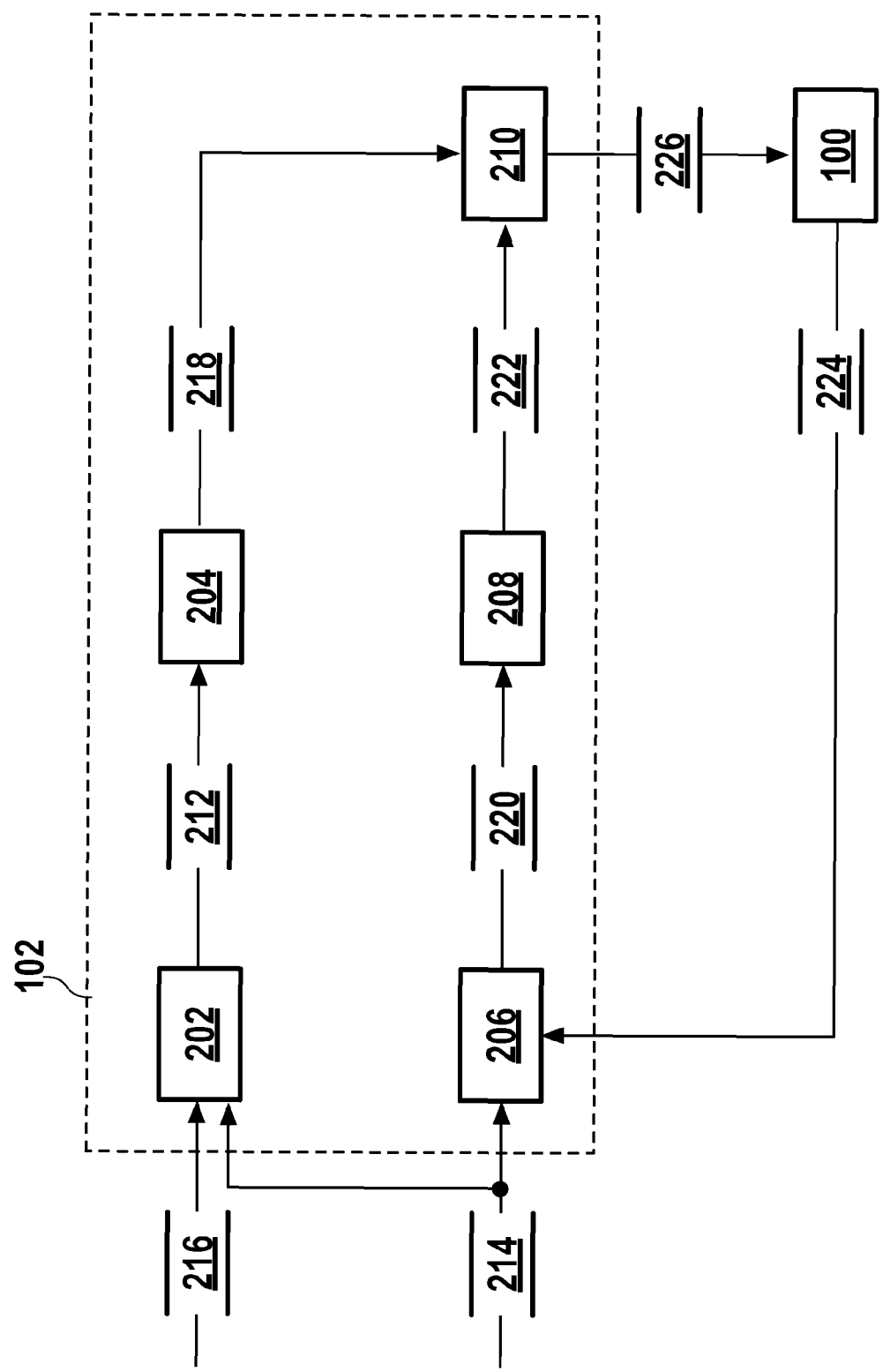
FIG. 2 depicts a block diagram of a control module in accordance with embodiments of the invention.

FIG. 2 depicts a block diagram of the control module 102 of FIG. 1 according to embodiments of the invention. The control module 102 includes several sub-modules, including an exhaust gas pressure estimation module 202, a base turbine command generation module 204, a discrepancy determination module 206, a discrepancy compensation module 208, and a final turbine command generation module 210.

The exhaust gas pressure estimation module 202 is configured to generate a desired exhaust gas pressure 212 based on a desired boost pressure 214 and other input signals and parameters 216. The desired boost pressure 214 is a signal that indicates a desired pressure of the compressed air supplied to the engine 104 in order to achieve a performance goal. The desired boost pressure 214 may be supplied by a module (not shown) other than the control module 102 or another sub-module (not shown) of the control module 102, which determines the desired boost pressure 214 based on, for example, an operator input from an accelerator pedal position sensor (not shown) or other signals and parameters. The input signals and parameters 216 are also supplied by modules (not shown) other than the control module 102 or other sub-modules (not shown) of the control module 102 which determine these signals and parameters based on signals from the sensor device(s) of the engine system 100 and one or more calibration tables (not shown in FIG. 1).

In embodiments, the exhaust gas pressure estimation module 202 uses the following model equation (1) to estimate the desired exhaust gas pressure:

$$p_{ex,dsr} = p_{to} f_1\left(\frac{\dot{m}_{ex}\sqrt{T_{ex}}}{p_{to}}, \frac{P_{c,dsr}}{h_t}\right) \quad (1)$$

where $p_{ex,dsr}$ is desired exhaust manifold pressure; $p_{to}$ is turbine outlet pressure measured by the exhaust turbine outlet pressure sensor 140; $\dot{m}_{ex}$ is an estimated exhaust gas flow rate, which is a derivative of the exhaust gas flow that is estimated based on, e.g., a summation of mass air flow and mass fuel flow to the engine 104; $T_{ex}$ is an estimated temperature of the exhaust gas flowing into the turbine 106; $p_{to}$ is turbine outlet pressure measured by the exhaust turbine outlet pressure sensor 140; $P_{c,dsr}$ is desired power to be generated by the compressor 108; and $h_t$ is exhaust gas enthalpy flow.

$$\frac{\dot{m}_{ex}\sqrt{T_{ex}}}{p_{to}}$$

is a corrected exhaust gas flow. As shown by the model equation (1), the desired exhaust manifold pressure can be computed by multiplying the measured turbine outlet pressure by a function ($f_t$) of the corrected exhaust gas flow and a ratio of the desired compressor power and the exhaust gas enthalpy flow.

The model equation (1) is driven by using the following equations (2)-(13):

$$P_t = h_t r_t \quad (2)$$

$$P_c = h_c r_c \quad (3)$$

$$h_t = \dot{m}_{ex} c_{pe} T_{ex} \quad (4)$$

$$h_c = \dot{m}_a c_{pa} T_a \quad (5)$$

$$Q_e = \frac{\dot{m}_{ex}\sqrt{T_{ex}}}{p_{to}} \quad (6)$$

$$\eta_t = f_2\left(\frac{p_{ex}}{p_{to}}, Q_e\right) \quad (7)$$

$$r_t = \eta_t\left[1 - \left(\frac{p_{ex}}{p_{to}}\right)^{\frac{\gamma-1}{\gamma}}\right] \quad (8)$$

$$Q_c = \frac{\dot{m}_a\sqrt{T_a}}{p_a} \quad (9)$$

$$\eta_c = f_3\left(\frac{p_i}{p_a}, Q_c\right) \quad (10)$$

$$r_c = \frac{1}{\eta_c}\left[\left(\frac{p_i}{p_a}\right)^{\frac{\gamma-1}{\gamma}} - 1\right] \quad (11)$$

$$J_t \frac{dN_t}{dt} N_t + h_c r_c = h_t r_t \quad (12)$$

$$P_c = P_t \quad (13)$$

Equation (2) is for computing turbine power ($P_t$), which is power generated by the turbine 106. In equation (2), $h_t$ is exhaust gas enthalpy, which is energy carried by the exhaust gas flowing into the turbine 106; and $r_t$ is a conversion rate for the turbine power. As shown by equation (2), the turbine power is computed by multiplying the exhaust gas enthalpy flow by the conversion rate. This conversion rate is usually less than one, indicating the loss of energy for driving the turbine 106.

Equation (3) is for computing compressor power ($P_c$), which is power generated by the compressor 108. In equation (3), $h_c$ is compressor inlet air enthalpy flow, which is energy carried by the air flowing into the compressor 108; and $r_c$ a conversion rate for the compressor power. As shown by equation (3), the compressor power is computed by multiplying the compressor inlet air enthalpy flow by the conversion rate. This conversion rate is usually larger than one, indicating the gain of energy by the compressor 108 from being driven by the turbine 106.

Equation (4) is for computing exhaust gas enthalpy flow ($h_t$), which is energy carried by the exhaust gas flowing into the turbine 106. In equation (4), $\dot{m}_{ex}$ is an estimated exhaust gas flow rate, which is a derivative of the exhaust gas flow that is estimated based on, e.g., a summation of mass air flow and mass fuel flow to the engine 104; $c_{pe}$ is specific heat of the exhaust gas flowing into the turbine 106; and $T_{ex}$ is an estimated temperature of the exhaust gas flowing into the turbine 106. As shown by equation (4) the exhaust gas enthalpy flow is a product of the exhaust gas flow rate, the specific heat of the exhaust gas, and the temperature of the exhaust gas.

Equation (5) is for computing compressor inlet air enthalpy flow ($h_c$), which is energy carried by the air flowing into the compressor 108. In equation (5), $\dot{m}_a$ is a mass air flow rate, which is a derivative of the mass air flow measured by the mass air flow sensor 128; $c_{pa}$ is specific heat of the air flowing into the compressor 108; and $T_a$ is temperature of the air flowing into the compressor 108 measured by the compressor inlet air temperature sensor 126. As shown by equation (5), the compressor inlet air enthalpy flow is a product of the mass air flow rate, the specific heat of the compressor inlet air, and the temperature of the compressor inlet air.

Equation (6) is for computing corrected exhaust gas flow ($Q_e$). In equation (6), $\dot{m}_{ex}$ is an estimated exhaust gas flow rate, which is a derivative of the exhaust gas flow that is estimated based on, e.g., a summation of mass air flow and mass fuel flow to the engine 104; $T_{ex}$ is an estimated temperature of the exhaust gas flowing into the turbine 106 and $p_{to}$ is turbine outlet pressure measured by the exhaust turbine outlet pressure sensor 140.

Equation (7) defines the turbine efficiency ($\eta_t$). In equation (7), $p_{ex}$ is an estimated exhaust manifold pressure; $p_{to}$ is turbine outlet pressure measured by the exhaust turbine outlet pressure sensor 140; and $Q_e$ is the corrected exhaust gas flow that is computed by using equation (6). As shown by equation (7), the turbine efficiency is a function ($f_2$) of a turbine expansion ratio (i.e., a ratio of $p_{ex}$ to $p_{to}$) and the corrected exhaust gas flow.

Equation (8) is for computing the conversion rate ($r_t$) for the turbine power. In equation (8), $\eta_t$ is the turbine efficiency computed by using equation (7); $p_{ex}$ is an estimated exhaust manifold pressure; $p_{to}$ is turbine outlet pressure measured by the exhaust turbine outlet pressure sensor 140; and $\gamma$ is a heat capacity ratio of ideal gas.

Equation (9) is for computing corrected mass air flow ($Q_c$). In equation (6), $\dot{m}_a$ is a mass air flow rate, which is a derivative of the mass air flow measured by the mass air flow sensor 128; $T_a$ is temperature of the air flowing into the compressor 108 measured by the compressor inlet air temperature sensor 126; and $p_a$ is compressor inlet pressure (i.e., ambient air pressure) measured by the compressor inlet air pressure sensor 124.

Equation (10) defines the compressor efficiency ($\eta_c$). In equation (10), $p_i$ is compressor outlet air pressure (i.e., intake manifold pressure) measured by the intake manifold pressure sensor 130; $p_a$ is compressor inlet pressure measured by the compressor inlet air pressure sensor 124; and $Q_c$ is the corrected mass air flow that is computed by using equation (9). As shown by equation (10), the compressor efficiency is a function ($f_3$) of compressor pressure ratio (i.e., a ratio of $p_i$ to $p_a$) and the corrected mass air flow.

Equation (11) is for computing the conversion rate ($r_c$) for the compressor power. In equation (11) $\eta_c$ is turbine efficiency; $p_i$ is compressor outlet air pressure measured by the intake manifold pressure sensor 130; $p_a$ is compressor inlet pressure measured by the compressor inlet air pressure sensor 124; and $\gamma$ is a heat capacity ratio or ideal gas.

Equation (12) is a dynamic power balance equation that shows a balance of the compressor power and the turbine power. In equation (12), $J_t$ is a moment inertia of the shaft 122, and $N_t$ is rotational velocity of the turbine 106. The second term $h_t r_t$ on the right side of equation (12) is the turbine power according to equation (2), and the term $h_c r_c$ on the left side of equation (12) is the compressor power according to equation (3). The first term on the left side of equation (12), which is a product of the turbine shaft moment inertia, the rotational acceleration of the turbine 106, and the rotational velocity of the turbine 106, is a difference between the turbine power and the compressor power. When the turbocharger (i.e., the turbine 106 and the compressor 108) operates in a steady state, the first term on the left side of equation (12) is zero because the rotational acceleration of the turbine 106 is zero at a steady state. Equation (13) is a power balance equation that shows a balance of the compressor power and the turbine power in a steady state.

With equations (2)-(13) described, deriving equation (1) from equations (2)-(9) will now be described. Using equations (9)-(11), equation (3) for computing the compressor power can be rewritten as the following equation (14):

$$P_c = h_c \frac{1}{f_3\left(\frac{p_i}{p_a}, \frac{\dot{m}_a \sqrt{T_a}}{p_a}\right)} \left[\left(\frac{p_i}{p_a}\right)^{\frac{\gamma-1}{\gamma}} - 1\right] \quad (14)$$

Desired compressor power ($P_{c,dsr}$) can be computed by plugging in a given desired boost pressure $p_{i,dsr}$ into equation (14), which results in the following equation (15):

$$P_{c,dsr} = h_c \frac{1}{f_3\left(\frac{p_i}{p_a}, \frac{\dot{m}_a \sqrt{T_a}}{p_a}\right)} \left[\left(\frac{p_{i,dsr}}{p_a}\right)^{\frac{\gamma-1}{\gamma}} - 1\right] \quad (15)$$

Using equations (6)-(8), equation (2) for computing the turbine power can be rewritten as the following equation (16):

$$P_t = h_t f_2\left(\frac{\dot{m}_{ex}\sqrt{T_{ex}}}{p_{to}}, \frac{p_{ex}}{p_{to}}\right)\left[1 - \left(\frac{p_{ex}}{p_{to}}\right)^{\frac{\gamma-1}{\gamma}}\right] \quad (16)$$

Because $$\left[1 - \left(\frac{p_{ex}}{p_{to}}\right)^{\frac{\gamma-1}{\gamma}}\right]$$

is also a function of $p_{ex}/p_{to}$s equation (16) can be written as the following equation (17):

$$P_t = h_t f_4\left(\frac{\dot{m}_{ex}\sqrt{T_{ex}}}{p_{to}}, \frac{p_{ex}}{p_{to}}\right) \quad (17)$$

Using the power balance equation (13), the desired compressor power ($P_{c,dsr}$) can be set equal to the turbine power ($P_t$) defined in equation (17), which results in the following equation (18):

$$P_{c,dsr} = h_t f_4\left(\frac{\dot{m}_{ex}\sqrt{T_{ex}}}{p_{to}}, \frac{p_{ex}}{p_{to}}\right) \quad (18)$$

Dividing both sides of equation (18) results in the following equation (19):

$$\frac{P_{c,dsr}}{h_t} = f_4\left(\frac{\dot{m}_{ex}\sqrt{T_{ex}}}{p_{to}}, \frac{p_{ex}}{p_{to}}\right) \quad (19)$$

Taking an inverse function on both sides of equation (19) to solve for $p_{ex}/p_{to}$ results in the following equation (20):

$$\frac{p_{ex}}{p_{to}} = f_4^{-1}\left(\frac{\dot{m}_{ex}\sqrt{T_{ex}}}{p_{to}}, \frac{P_{c,dsr}}{h_t}\right) \quad (20)$$

Multiplying both sides of equation (20) by $p_{to}$ results in equation (1):

$$p_{ex,dsr} = p_{to} f_4^{-1}\left(\frac{\dot{m}_{ex}\sqrt{T_{ex}}}{p_{to}}, \frac{P_{c,dsr}}{h_t}\right) \quad (1)$$

The base turbine command generation module 204 generates a base VGT vane position control command 218 based on the desired exhaust gas pressure 212 received from the exhaust gas pressure estimation module 202. In embodiments, the base turbine command generation module 204 uses the following equation (21) to compute the base VGT vane position control command 218:

$$VGT = f_5\left(\frac{p_{ex}}{p_{to}}, \frac{\dot{m}_{ex}}{\frac{p_{ex}}{\sqrt{RT_{ex}}} \cdot f_6\left(\frac{p_{ex}}{p_{to}}\right)}\right) \quad (21)$$

In equation (21), $p_{ex}$ is exhaust manifold pressure; $p_{to}$ is turbine outlet pressure; $p_{ex}/p_{to}$ is a turbine expansion ratio; $\dot{m}_{ex}$ is an exhaust gas flow rate; $T_{ex}$ is exhaust gas temperature; R is ideal gas constant. Equation (21) for computing the VGT vane position may also be derived from the equations described in U.S. Patent Application Publication No. 2012/0173118, which is incorporated herein in its entirety. The base turbine command generation module 204 generates the VGT vane position control command by plugging in the desired exhaust gas pressure 212 determined by the exhaust gas pressure estimation module 202. The base turbine command generation module 204 also uses the turbine outlet pressure $p_{to}$ measured by the exhaust turbine outlet pressure sensor 140 and the estimated exhaust gas temperature. The base VGT vane position control command 218 is combined with a discrepancy compensation command 222 as will be described further below.

The discrepancy determination module 206 computes a discrepancy 220 based on the desired boost pressure 214 and a measured boost pressure 224 from the engine system 100 (e.g., measured by the intake manifold pressure sensor 130). In embodiments, the discrepancy determination module 206 subtracts the measured boost pressure 224 (i.e., a feedback) from the desired boost pressure 214 to determine the discrepancy 220.

The discrepancy compensation module 208 generates the discrepancy compensation command 222 based on the discrepancy 220. The discrepancy compensation command 222 is for adjusting the base VGT vane position control command 218 based on the difference between the desired boost pressure and the actual, measured boost pressure. That is, the discrepancy compensation module 208 is a proportional-integral-derivative (PID) control module.

The final turbine command generation module 210 generates a final VGT vane position control command 226 to send to the engine system 100 such that the turbine 106 adjusts the VGT vane position, as commanded, to generate the desired boost pressure. In embodiments, the final turbine command generation module 210 generates the final VGT vane position control command 226 by adding the base VGT vane position control command 218 and the discrepancy compensation command 222.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 2 may be combined and/or further partitioned. For instance, the discrepancy determination module 206, the discrepancy compensation module 208, and the final turbine command generation module 210 may be combined into a single proportional module.

Figure 3:
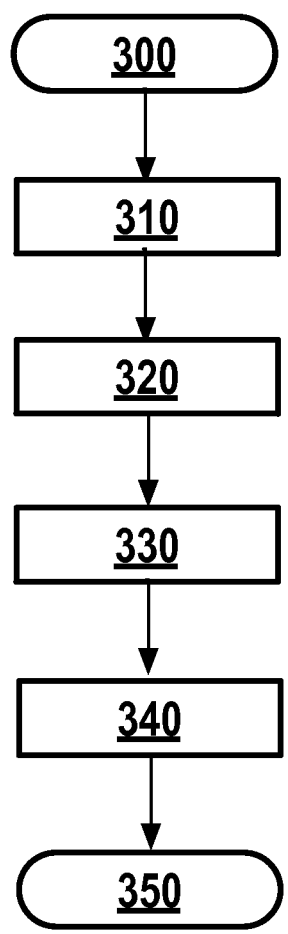
FIG. 3 is a flowchart illustrating a method in accordance with embodiments of the invention.

Referring now to FIG. 3, and with continued reference to FIGS. 1 and 2, a flowchart illustrates a method for generating a VGT vane position control command to achieve a boost pressure. In embodiments, the method can be performed by the control module 102 of FIGS. 1 and 2. As can be appreciated in light of the disclosure, the order of operation within the method is not limited to the sequential execution as illustrated in FIG. 3, but may be performed in one or more varying orders as applicable and in accordance with the present disclosure. In embodiments, the method can be scheduled to run based on predetermined events, and/or run continually during operation of the engine system 100.

In one example, the method may begin at block 300. At block 310, the control module 102 determines a desired exhaust gas pressure based on a desired boost pressure. In embodiments, the control module 102 uses a model for power balance between the turbine 106 and the compressor 108 of a turbocharger to determined the desired exhaust gas pressure. In embodiments, the control module 102 determines the desired exhaust gas pressure by using equation (1), which is driven from equations (2)-(13) that need the desired boost pressure 214, and other input signals and parameters 216. The control module 102 determines the desired exhaust gas pressure 212 in order to use the desired exhaust gas pressure to estimate the turbine expansion ratio.

In alternative embodiments, the control module 102 at block 310 estimates the turbine expansion ratio by using another lookup table (not shown in FIGS. 1 and 2) for estimated turbine expansion ratio values indexed by different velocity values of the engine 104 (e.g., in revolutions per minute (RPM)) and different desired compressor pressure ratio (e.g., a ratio of a desired compressor outlet air pressure to a compressor inlet pressure) values. This lookup table defines desired engine exhaust gas pressure as a function of engine velocity and desired compressor pressure ratio.

In yet other alternative embodiments, the control module 102 at block 310 estimates the turbine expansion ratio by using a lookup table (not shown in FIGS. 1 and 2) for estimated turbine expansion ratio values indexed by different engine velocity values and different fuel consumption rate values of the engine 104. This lookup table defines desired engine exhaust gas pressure as a function of engine velocity and fuel consumption rate.

At block 320, the control module 102 generates a base VGT vane position control command 218 based on the desired exhaust gas pressure 212 determined at block 310. In embodiments, the control module 102 uses equation (21) to generate the base VGT vane position control command 218. As shown by equation (21), the VGT vane position control command is a function of the turbine expansion ratio determined based on the desired exhaust gas pressure 212, which is determined at block 310.

At block 330, the control module 102 generates a discrepancy compensation command 222 based on a difference between the desired boost pressure 214 and the actual, measured boost pressure 224. In embodiments, the control module 102 determines the difference by subtracting the measured boost pressure 224 from the desired boost pressure 214. The discrepancy compensation command is for adjusting the base VGT vane position control command 218 determined at block 320.

At block 340, the control module 102 generates a final VGT vane position control command 226 to send to the engine system 100 such that the turbine 106 adjusts the VGT vane position, as commanded, to generate the desired boost pressure. In embodiments, the control module 102 generates the final VGT vane position control command 226 by adding the base VGT vane position control command 218 and the discrepancy compensation command 222 generated at block 330. The method ends at block 350.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling a turbine of an engine system to achieve a commanded boost pressure, the method comprising:
   determining, in a control module, an exhaust gas pressure based on the commanded boost pressure by using a model for a power balance between the turbine and a compressor of the engine system using an equation $$p_{ex,dsr} = p_{to} f\left(\frac{\dot{m}_{ex}\sqrt{T_{ex}}}{p_{to}}, \frac{P_{c,dsr}}{h_t}\right),$$

wherein where $p_{ex,dsr}$ is exhaust gas pressure; $p_{to}$ is a measured turbine outlet pressure, $\dot{m}_{ex}$ is an estimated exhaust gas flow rate, $T_{ex}$ is an estimated temperature of the exhaust gas, $p_{to}$ is a measured turbine outlet pressure, $P_{c,dsr}$ is a power to be generated by the compressor, and $h_t$ is an exhaust gas enthalpy flow;
   generating, at the control module, a base command for controlling a position of a vane of the turbine to a threshold ratio of the exhaust gas pressure to a measured turbine outlet pressure;
   sending a vane position command from the control module to the turbine of the engine system; and
   adjusting the vane position of the turbine.

2. The method of claim 1, further comprising:
   generating a compensation command based on a difference between the commanded boost pressure and a measured boost pressure;
   generating a final command based on the base command and the compensation command; and
   sending the final command to the turbine to control the turbine.

3. The method of claim 1, wherein the turbine is a variable geometry turbine (VGT).

4. The method of claim 1, wherein the generating the base command comprises using a function $$f\left(\frac{p_{ex}}{p_{to}}, \frac{\dot{m}_{ex}}{\frac{p_{ex}}{\sqrt{RT_{ex}}} \cdot f_1\left(\frac{p_{ex}}{p_{to}}\right)}\right),$$

wherein $p_{ex}$ is an estimated exhaust gas pressure, $p_{to}$ is a measured turbine outlet pressure, $p_{ex}/p_{to}$ is a turbine expansion ratio, $\dot{m}_{ex}$ is an exhaust gas flow rate, $T_{ex}$ is an estimated exhaust gas temperature, and R is ideal gas constant.

5. The method of claim 1, further comprising mapping the ratio of the exhaust gas pressure to the measured turbine outlet pressure to a look up table for estimated turbine expansion ratio values indexed by different velocity values of an engine of the engine system and different desired compressor pressure ratio values.

6. The method of claim 1, further comprising mapping the ratio of the exhaust gas pressure to the measured turbine outlet pressure to a look up table for estimated turbine expansion ratio values indexed by different velocity values of an engine of the engine system and different fuel consumption rate values of the engine.

7. An engine system comprising:
an engine;
a turbine driven by exhaust gas from the engine;
a compressor driven by the turbine; and
a control module for controlling the turbine to achieve a commanded boost pressure, the control module comprising a processor coupled to a memory, the control module configured to:
determine an exhaust gas pressure based on the commanded boost pressure by using a model for a power balance between the turbine and a compressor of the engine system using an equation $$p_{ex,dsr} = p_{to} f\left(\frac{\dot{m}_{ex}\sqrt{T_{ex}}}{p_{to}}, \frac{P_{c,dsr}}{h_t}\right),$$

wherein where $p_{ex,dsr}$ is exhaust gas pressure; $p_{to}$ is a measured turbine outlet pressure, $\dot{m}_{ex}$ is an estimated exhaust gas flow rate, $T_{ex}$ is an estimated temperature of the exhaust gas, $p_{to}$ is a measured turbine outlet pressure, $P_{c,dsr}$ is a power to be generated by the compressor, and $h_t$ is an exhaust gas enthalpy flow;
generate a base command for controlling a position of a vane of the turbine to a threshold ratio of the exhaust gas pressure to a measured turbine outlet pressure.

8. The engine system of claim 7, wherein the control module is further configured to:
generate a compensation command based on a difference between the commanded boost pressure and a measured boost pressure;
generate a final command based on the base command and the compensation command; and
send the final command to the turbine to control the turbine.

9. The engine system of claim 7, wherein the turbine is a variable geometry turbine (VGT).

10. The engine system of claim 7, wherein the control module is configured to generate the base command by using a function $$f\left(\frac{p_{ex}}{p_{to}}, \frac{\dot{m}_{ex}}{\frac{p_{ex}}{\sqrt{RT_{ex}}} \cdot f_1\left(\frac{p_{ex}}{p_{to}}\right)}\right),$$

wherein $p_{ex}$ is an estimated exhaust gas pressure, $p_{to}$ is a measured turbine outlet pressure, $p_{ex}/p_{to}$ is a turbine expansion ratio, $\dot{m}_{ex}$ is an exhaust gas flow rate, $T_{ex}$ is an estimated exhaust gas temperature, and R is ideal gas constant.

11. The engine system of claim 7, wherein the control module is further configured to map the ratio of the exhaust gas pressure to the measured turbine outlet pressure to a look up table for estimated turbine expansion ratio values indexed by different velocity values of an engine of the engine system and different desired compressor pressure ratio values.

12. The engine system of claim 7, wherein the control module is further configured to map the ratio of the exhaust gas pressure to the measured turbine outlet pressure to a look up table for estimated turbine expansion ratio values indexed by different velocity values of an engine of the engine system and different fuel consumption rate values of the engine.

13. A control system for controlling a turbine of an engine system to achieve a commanded boost pressure, the control system comprising:
a first module configured to determine a exhaust gas pressure based on the commanded boost pressure by using a model for a power balance between the turbine and a compressor of the engine system using an equation $$p_{ex,dsr} = p_{to} f\left(\frac{\dot{m}_{ex}\sqrt{T_{ex}}}{p_{to}}, \frac{P_{c,dsr}}{h_t}\right),$$

wherein where $p_{ex,dsr}$ is exhaust gas pressure; $p_{to}$ is a measured turbine outlet pressure, $\dot{m}_{ex}$ is an estimated exhaust gas flow rate, $T_{ex}$ is an estimated temperature of the exhaust gas, $p_{to}$ is a measured turbine outlet pressure, $P_{c,dsr}$ is a power to be generated by the compressor, and $h_t$ is an exhaust gas enthalpy flow; and
a second module configured to generate a base command for controlling a position of a vane of the turbine to a threshold ratio of the exhaust gas pressure to a measured turbine outlet pressure.

14. The control system of claim 13, further comprising a third module configured to:
generate a compensation command based on a difference between the commanded boost pressure and a measured boost pressure;
generate a final command based on the base command and the compensation command; and
send the final command to the turbine to control the turbine.

15. The control system of claim 13, wherein the turbine is a variable geometry turbine (VGT).

16. The control system of claim 13, wherein the second module is configured to generate the base command by using a function $$f\left(\frac{p_{ex}}{p_{to}}, \frac{\dot{m}_{ex}}{\frac{p_{ex}}{\sqrt{RT_{ex}}} \cdot f_1\left(\frac{p_{ex}}{p_{to}}\right)}\right),$$

wherein $p_{ex}$ is an estimated exhaust gas pressure, $p_{to}$ is a measured turbine outlet pressure, $p_{ex}/p_{to}$ is a turbine expansion ratio, $\dot{m}_{ex}$ is an exhaust gas flow rate, $T_{ex}$ is an estimated exhaust gas temperature, and R is ideal gas constant.

17. The control system of claim 13, wherein the second module is configured to generate the ratio of the exhaust gas pressure to the measured turbine outlet pressure by using a look up table for estimated turbine expansion ratio values indexed by different velocity values of an engine of the engine system and different desired compressor pressure ratio values.

* * * * *